US010371347B2

(12) United States Patent
Paroni et al.

(10) Patent No.: US 10,371,347 B2
(45) Date of Patent: Aug. 6, 2019

(54) VEHICLE LIGHT COMPRISING A PORTION OF LIGHT EMISSION WITH OPALESCENT EFFECT

(71) Applicant: AUTOMOTIVE LIGHTING ITALIA S.p.A., Turin (IT)

(72) Inventors: Sara Paroni, Turin (IT); Marco Svettini, Turin (IT)

(73) Assignee: AUTOMOTIVE LIGHTING ITALIA S.p.A., Turin (IT)

( * ) Notice: Subject to any disclaimer, the term of this patent is extended or adjusted under 35 U.S.C. 154(b) by 0 days.

(21) Appl. No.: 15/825,839

(22) Filed: Nov. 29, 2017

(65) Prior Publication Data
US 2018/0149335 A1   May 31, 2018

(30) Foreign Application Priority Data
Nov. 30, 2016   (IT) .................. 102016000121552

(51) Int. Cl.
*F21V 5/00*  (2018.01)
*F21S 41/20* (2018.01)
*G02B 5/02*  (2006.01)
*G02B 3/00*  (2006.01)
(Continued)

(52) U.S. Cl.
CPC ............ *F21V 5/002* (2013.01); *F21S 41/285* (2018.01); *F21S 43/14* (2018.01); *F21S 43/26* (2018.01); *G02B 3/0006* (2013.01); *G02B 5/0294* (2013.01)

(58) Field of Classification Search
None
See application file for complete search history.

(56) References Cited

U.S. PATENT DOCUMENTS

2007/0081254 A1*   4/2007   Endle ................ G02B 3/0056
                                                           359/626
2014/0056016 A1*   2/2014   Marcori ................ F21S 43/14
                                                           362/487

FOREIGN PATENT DOCUMENTS

DE   102012107082 A1   2/2014
EP       0649125 A1   4/1995
EP       1304260 A1   4/2003
(Continued)

OTHER PUBLICATIONS

Search Report for Italian Patent Application No. 102016000121552 dated Jul. 21, 2017 and dated Aug. 2, 2017.
(Continued)

*Primary Examiner* — Vip Patel
(74) *Attorney, Agent, or Firm* — Howard & Howard Attorneys PLLC

(57) ABSTRACT

A vehicle light comprising a container body that houses at least one light source that emits a plurality of light rays (Ri). A lenticular body is at least partially crossed by the light beam produced by the light source. A diffuser body faces at least one light source, so as to receive the light beam from the diffuser body and extends along a main transverse extension (T-T) perpendicular to a main direction of propagation (L-L) of the light beam. The diffuser body comprises a first group of first optical elements defining cylindrical or spherical optics which scatter the light rays (Ri) towards the light output wall and emit an opalescent light beam. The first optical elements of the first group form a single body, and the first optical elements are separated from the light source and the lenticular body by air gaps.

20 Claims, 6 Drawing Sheets

(51) Int. Cl.
F21S 43/14 (2018.01)
F21S 43/20 (2018.01)

(56) References Cited

FOREIGN PATENT DOCUMENTS

| | | |
|---|---|---|
| EP | 1528527 A1 | 5/2005 |
| EP | 2481635 A1 | 8/2012 |
| EP | 2568320 A2 | 3/2013 |
| GB | 2497324 A | 6/2013 |
| WO | 2004094896 A2 | 11/2004 |

OTHER PUBLICATIONS

European Search Report for European Patent Application No. 17204505 dated Mar. 22, 2018.

* cited by examiner

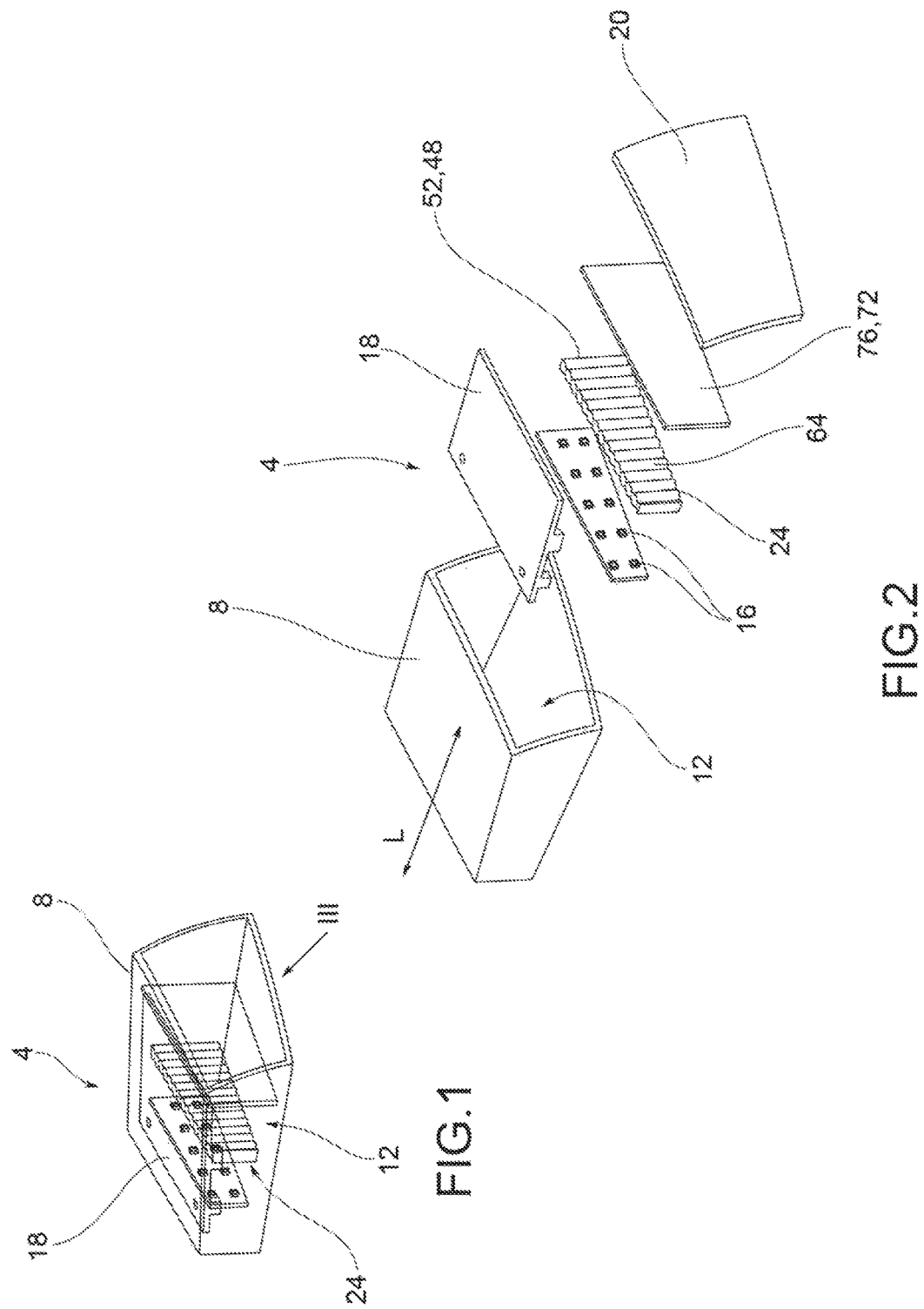

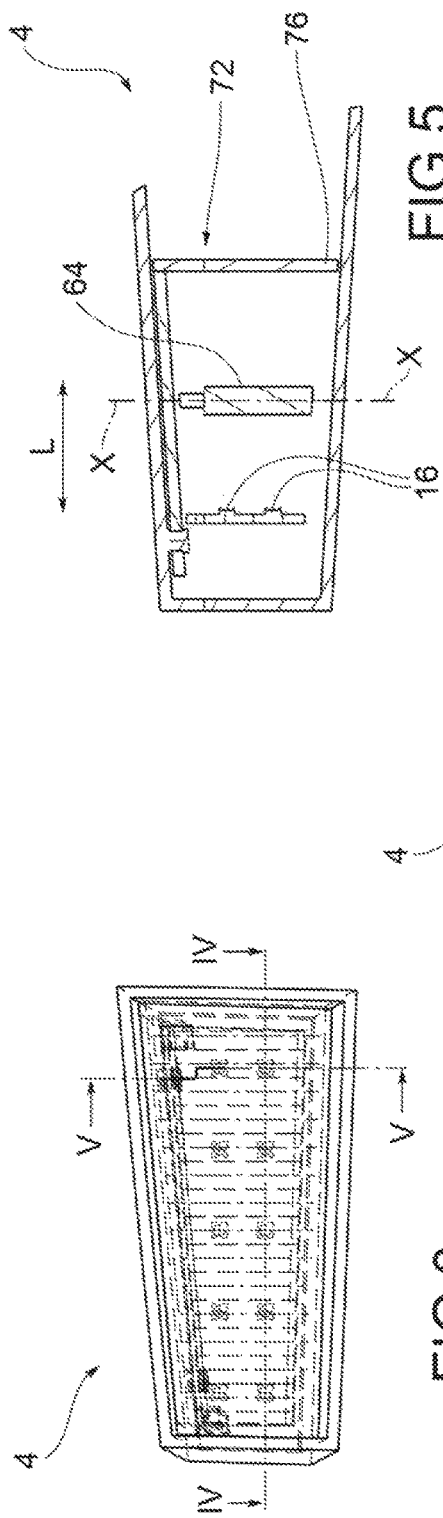
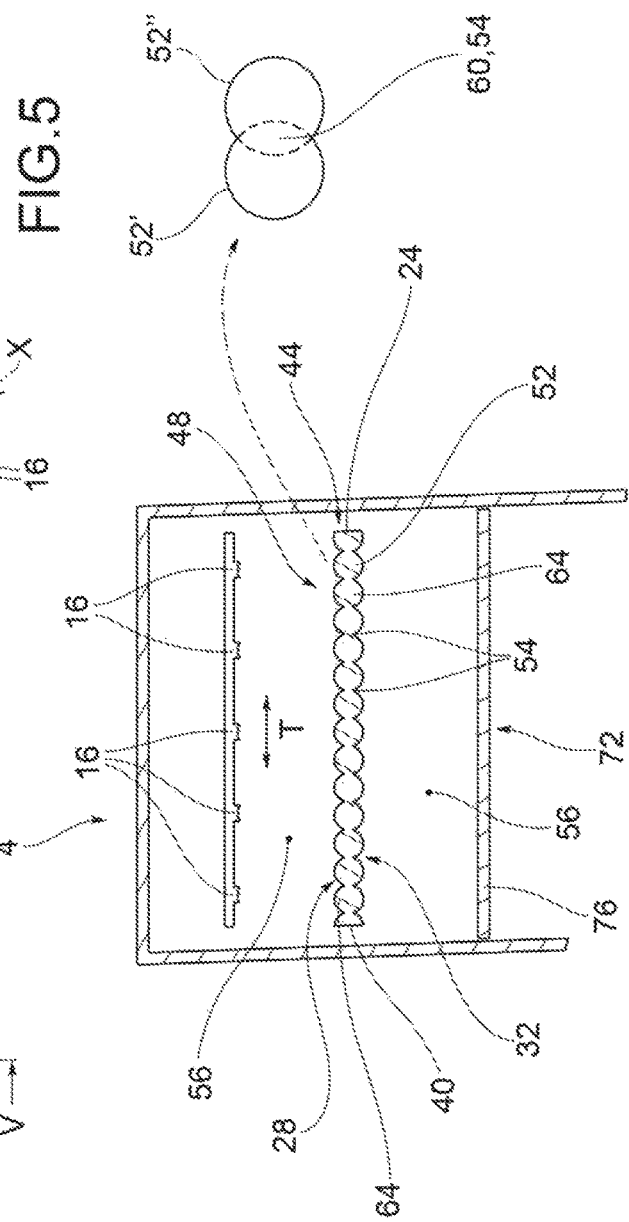

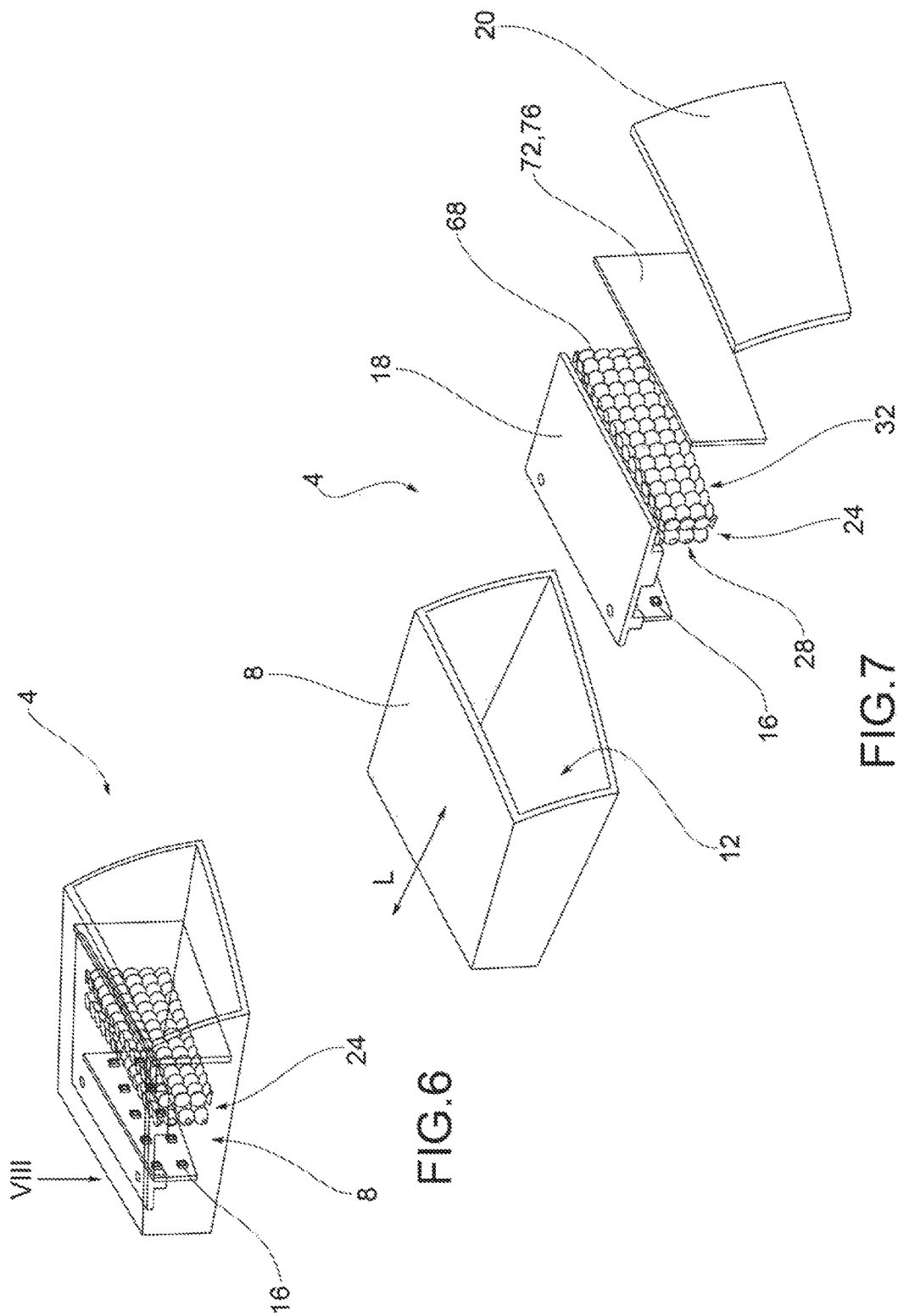

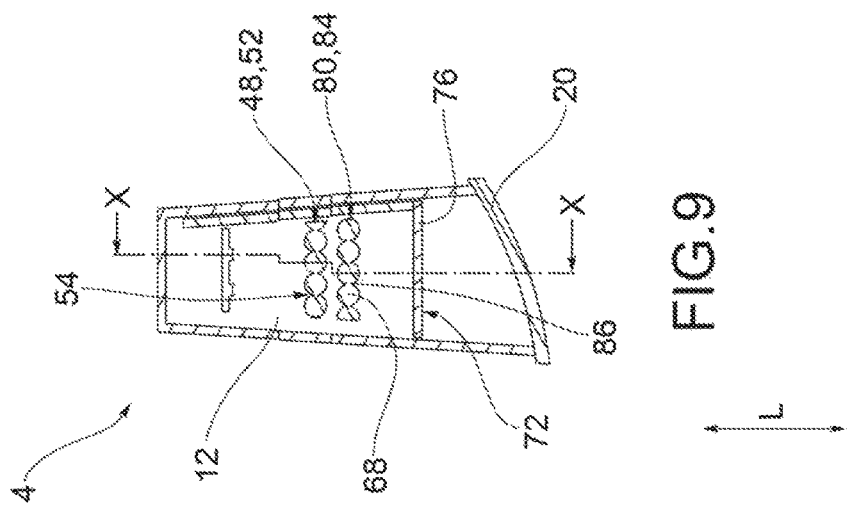
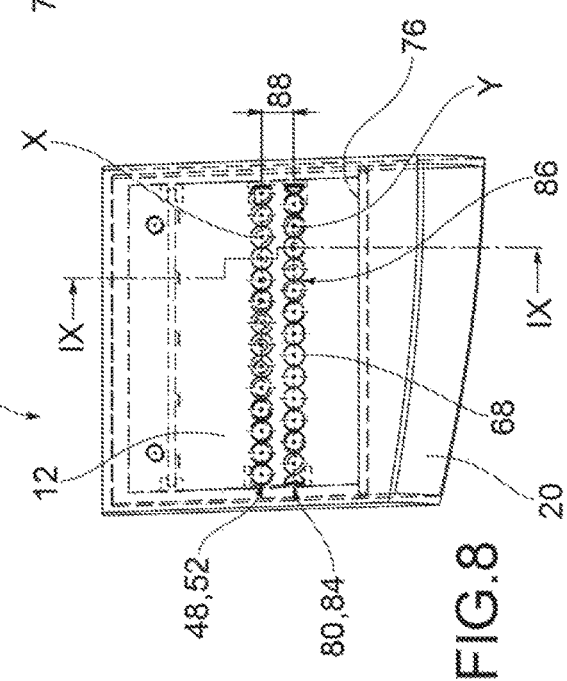
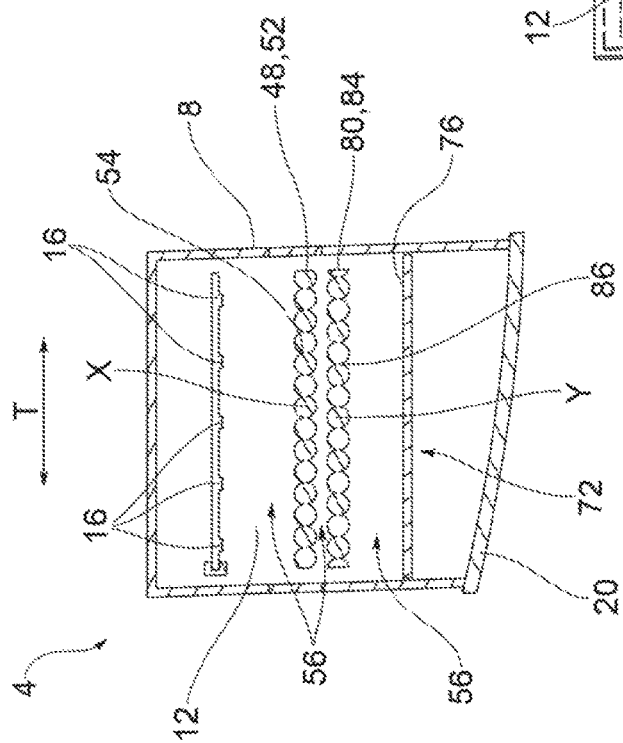

US 10,371,347 B2

VEHICLE LIGHT COMPRISING A PORTION OF LIGHT EMISSION WITH OPALESCENT EFFECT

CROSS-REFERENCE TO RELATED APPLICATIONS

The present application claims priority to and all the benefits of Italian Patent Application No. 102016000121552, filed on Nov. 30, 2016, which is hereby expressly incorporated herein by reference in its entirety.

BACKGROUND OF THE INVENTION

1. Field of the Invention

The present invention concerns a vehicle light comprising a portion of light emission with opalescent effect.

2. Description of the Related Art

The term "vehicle light" is intended indifferently to mean a rear vehicle light or a front vehicle light, the latter also being called a headlight or headlamp.

As is known, a vehicle light is a lighting and/or signaling device of a vehicle comprising at least one light on the outside of the vehicle having a lighting and/or signaling function outwards from a vehicle such as, for example, a position light, a turn signal light, a brake light, a rear fog light, a reversing light, a low beam headlight, a high beam headlight, and the like.

The vehicle light, in its simplest abstraction, comprises a container body, a lenticular body, and at least one light source.

The lenticular body is positioned to close the mouth of a container body so as to form a housing chamber. The light source is arranged inside the housing chamber, which may be turned so as to emit light toward the lenticular body when powered by electricity.

The construction of a vehicle light, after assembling the various components, involves fixing and hermetically sealing the lenticular body on the container body.

It is increasingly perceived in the art the need to use the vehicle light not only as an instrument to satisfy the requirements of standardization in order to obtain light beams that meet particular photometric requirements, but also as an instrument of design specific to the vehicle on which the light is employed.

Therefore, the light pattern emitted by the light does not only have the function of fulfilling the signaling and/or lighting function, but also that of creating a precise desired lighting effect. This lighting effect or pattern increasingly represents the leitmotif of some automobile manufacturers who, also with the optical component of the lights, intend to set themselves apart from their competitors.

Such lighting effects should not, however, compromise the uniformity of the light beam produced which, although not related to specific photometric requirements, is considered essential by end users. In other words, a non-uniform light beam, although meeting the photometric requirements for a light, would be considered an unacceptable "defect" by the end user of the vehicle light.

Various ways of ensuring uniformity are known, for example, introducing a lens or a filter with an opalescent effect.

There are various methods in the art for obtaining the opaline effect on vehicle lights. The most popular use opalescent materials which, when struck by the light beam, are able to generate the lighting effect of opalescence.

The opaline material is made of a polymeric material that incorporates microspheres made of a different material so as to disperse light randomly.

By virtue of this random diffusion of the beam, it is possible to obtain the opaline effect.

There are, however, some regulations, such as those in the US, prohibiting the use of such materials in the automotive light industry.

SUMMARY OF THE INVENTION

It is thus perceived in the art the need to provide a vehicle light which produces a light beam that is both uniform and opalescent at the same time without any use of opaline material.

Such requirement is satisfied by a vehicle light including a container body delimiting a containment housing which houses at least one light source that emits, when electrically powered, a plurality of light rays (Ri) defining a light beam to propagate outside the vehicle light. A lenticular body closes, at least partially, the containment seat and is crossed, at least partially, by the beam of light produced by the light source. A diffuser body is defined by a light input wall and a light output wall. The diffuser body faces the at least one light source, so as to be crossed by its beam of light. The diffuser body faces the lenticular body and extends along a main transverse extension (T-T) perpendicular to a main propagation direction (L-L) of the beam of light. The diffuser body includes a first group of first optical elements defining cylindrical optics with circular cross-section or spherical optics suitable to realize cylindrical or spherical caustics which realize, by subsequent refractions, a scattering of the light rays (Ri) towards the light output wall in order to produce a beam of light having an opalescent effect. The first optical elements of the first group are solid bodies juxtaposed without interruption so as to form a single body, and wherein the first optical elements are separated from the light source and from the lenticular body, by air gaps.

Other objects, features and advantages of the present invention will be readily appreciated as the same becomes better understood after reading the subsequent description taken in connection with the accompanying drawings.

BRIEF DESCRIPTION OF THE DRAWINGS

FIG. 1 is a transparent perspective view of the front side of a vehicle light according to the present invention in an assembly configuration;

FIG. 2 is a transparent perspective view, in separate parts, of the vehicle light of FIG. 1;

FIG. 3 is a front view of the vehicle light of FIG. 1, on the side of the arrow III of FIG. 1;

FIG. 4 is a sectional view of the vehicle light of FIG. 1 along the sectional plane IV-IV shown in FIG. 3;

FIG. 5 is a sectional view of the vehicle light of FIG. 1 along a sectional plane V-V indicated in FIG. 3;

FIG. 6 is a transparent perspective view of the front side of a vehicle light according to a further embodiment of the present invention in an assembly configuration;

FIG. 7 is a transparent perspective view, in separate parts, of the vehicle light of FIG. 6;

FIG. 8 is a plan view from the top of the vehicle light of FIG. 6, on the side of the arrow VIII of FIG. 6;

FIG. 9 is a sectional view of the vehicle light of FIG. 6 along the sectional plane IX-IX shown in FIG. 8;

FIG. 10 is a sectional view of the vehicle light of FIG. 6 along a sectional plane X-X indicated in FIG. 9;

Figure 12:
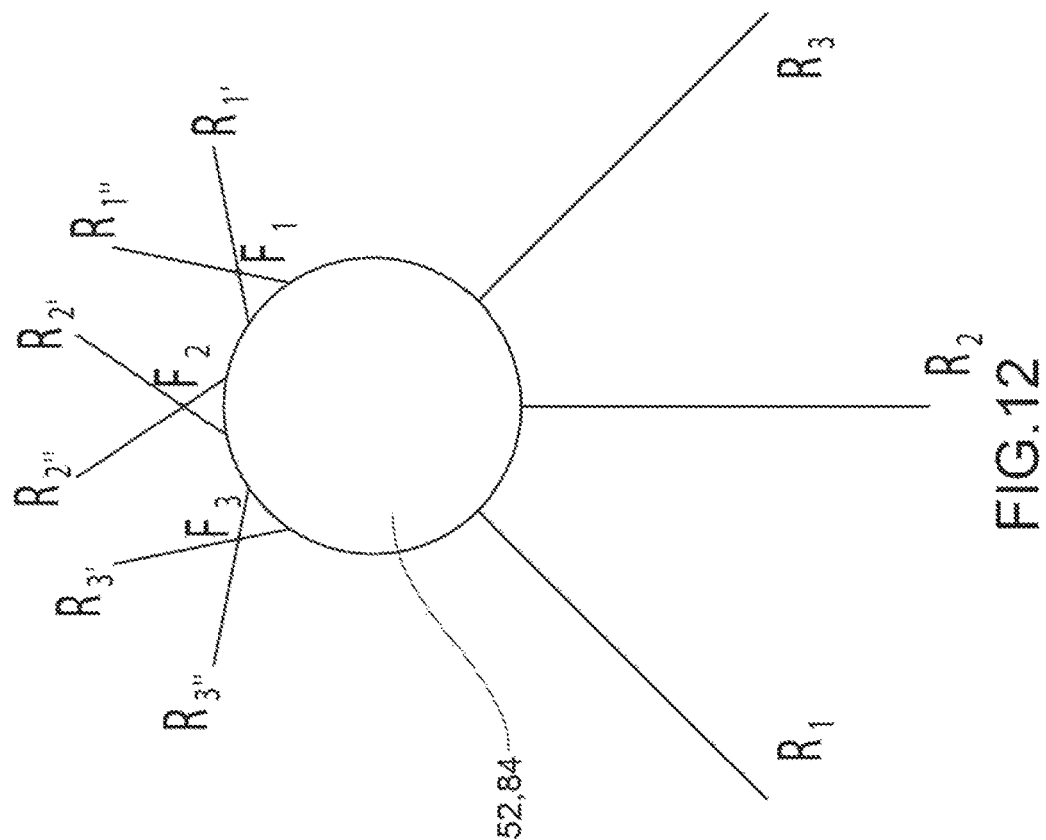
FIG. 12 is another schematic view of the optical behavior of a vehicle light according to the present invention.

The elements or parts of elements in common between the embodiments described hereinafter will be indicated at the same numerical references.

DETAILED DESCRIPTION OF THE INVENTION

With reference to the aforementioned figures, a vehicle light to which the following discussion will refer is indicated collectively at 4 without thereby losing generality.

As mentioned above, the term "vehicle light" is intended indifferently to mean a rear vehicle light or a front vehicle light, the latter being also called a headlight or headlamp.

As is known, the vehicle light comprises at least one light outside of the vehicle having a lighting and/or signaling function, such as, for example, a position light, which may be a front, back, side position light, a turn signal light, a brake light, a rear fog light, a reversing light, a low beam headlight, a high beam headlight, and the like.

The vehicle light 4 comprises a container body 8, usually made of polymeric material, which typically allows the vehicle light 4 to be attached to the related vehicle.

For the purposes of the present invention, the container body 8 may have any shape, size or position: for example, the container body 8 may not be directly associated with the bodywork or other attachments of the associable vehicle.

According to one embodiment, the container body 8 delimits a containment seat 12 that houses at least one light source 16 suitable to emit, when electrically powered, a plurality of light rays Ri defining a light beam to be propagated outside of the vehicle light 4. For the purposes of the present invention, the type of light source used is irrelevant; preferably, the light source 16 is a light emitting diode (LED) light source.

The housing body 8 may accommodate, in the containment seat 12, intermediate support elements 18 of the various optical and/or electronic components of the vehicle light 4, in a known manner.

For example, the light sources 16 are electrically supported and powered by use of suitable bases 19, in a known manner.

The vehicle light 4 also comprises a lenticular body 20, at least partially contiguous to the container body 8.

The lenticular body 20 is applied to the container body 8 so as to close at least partially the containment seat 12, which houses the at least one primary light source 16.

For the purposes of the present invention, the lenticular body 20 may be external so as to define at least one outer wall of the vehicle light directly subjected to the outside environment.

It is also possible to provide that the lenticular body 20 is inside a vehicle so as to be housed inside a vehicle's interior. This is the case, for example, of a dome light or a light that is part of a dashboard of a vehicle.

The lenticular body 20 closes the containment seat 12 and is suitable to be crossed by the light beam produced by the main light source 16.

In this regard, the lenticular body 20 is made of at least partially transparent or semi-transparent or translucent material, which may also include one or more opaque portions, so as to still allow the crossing, at least partial, of a primary light beam emitted by the at least one primary light source 16.

According to possible embodiments, the material of the lenticular body 20 is a resin such as PMMA, PC and the like.

The vehicle light 4 also comprises a diffuser body 24 defined by its light input wall 28 and its light output wall 32.

The diffuser body 24 faces the at least one light source 16 so as to be crossed by the light beam thereof.

The light output wall 32 may directly and indirectly face the lenticular body 20. The term "directly" as used herein means that the light output wall 32 is at least partially in front of the lenticular body 20. The term "indirectly" as used herein means the light output wall 32 is not positioned in front of the lenticular body 20 but may direct the light beam emitted therefrom onto the lenticular body 20, for example, through the interposition of a reflecting surface.

The diffuser body 24 extends along a main transverse extension T-T preferably perpendicular to a main direction of propagation L-L of the light beam.

Advantageously, the diffuser body 24 has a first group 48 of first optical elements 52 defining cylindrical optics with circular cross-section or spherical optics suitable to make cylindrical or spherical caustics which realize, by subsequent refractions, a scattering of the light rays Ri towards the light output wall 32 in order to emit a beam of light having an opalescent effect.

Advantageously, the first optical elements 52 of the first group 48 are solid bodies juxtaposed without interruption, for example, at least partially interpenetrating so as to form a single body.

In particular, the first adjacent optical elements 52', 52" at least partially penetrate each other at the first intersection portions 54 which realize a mechanical connection between the first optical elements adjacent to one another.

Therefore, the first optical elements 52 of the first group 48 are separated from the light source 16 and from the lenticular body 20, by air gaps 56.

According to one embodiment, the first optical elements 52 of the first group 48 have a diameter ranging from 1 mm to 5 mm.

As mentioned above, the first optical elements 52 are substantially tangential or at least partially penetrate each other, e.g. for a circular sector 60 equal to 1 to 10% of their total area, measured with respect to a sectional plane perpendicular to a first axis of symmetry X-X of the first optical elements 52 (see enlarged detail VI in FIG. 4, relating to two first adjacent optical elements 52', 52").

It should be noted that the tangency or the interpenetration of the first optical elements 52 may depend on the production process: an injection molding process generally assumes an interpenetration of the same elements.

For the purposes of the operation of the present invention, it is important that there is no free path from the first optical elements 52 for the light rays Ri; in other words, all the rays Ri must pass through the first optical elements 52 to be optically influenced by the same.

According to a possible embodiment (FIG. 1-5), the first optical elements 52 are cylinders 64 with a circular cross-section, with respective axes of symmetry X-X perpendicular to the main direction of propagation L-L of the light beam, equidistant from each other and all having the same diameter.

According to a possible further embodiment (FIGS. 6-10), the first optical elements 52 are spheres 68, equidistant from each other and having the same diameter.

Preferably, the diffuser body 24, on the light output wall 32 has a diffuser portion 72, comprising micro-optics and/or an embossing and/or a glaze, suitable to equalize and to diffuse the light beam that is emitted by the light output wall 32.

In other words, the diffuser portion 72 serves to blur the light until the contour of the first optical elements 52 is removed so as to freeze the only contribution provided by the aforementioned cylindrical or spherical optics.

Therefore, in order to get the opalescent effect it is necessary the synergy between the first optical elements 52 and the diffuser portion 72.

In fact, the first optical elements 52 perform by subsequent refractions, a scattering of the light rays Ri towards the light output wall 32, and the diffuser portion 72 blurs the light until the contour of the first optical elements 52 is removed so as to freeze the only contribution provided by the aforementioned cylindrical or spherical optics. In this way, a whole and uniform opalescent effect can be obtained.

The diffuser portion 72, comprising micro-optics and/or an embossing and/or glaze, suitable to equalize and to diffuse the light beam that is emitted by the light output wall 32, may also be made on the lenticular body 20.

It is also possible to provide for a screen 76 placed between the diffuser body 24 and the lenticular body 20, the screen comprising a diffusive portion 72, comprising micro-optics and/or embossing and/or a glaze, suitable to equalize and to diffuse the beam of light coming from the light output wall 32. Obviously, the screen is crossed by the light beam incident thereon.

Preferably, the container body 8 houses at least two light sources 16', 16" suitable to emit, when electrically powered, a plurality of light rays Ri', Ri" which expand in light cones C' C".

The aperture β of the cones defines a light intensity equal to half the intensity emitted by the light source along its optical axis.

Figure 13:
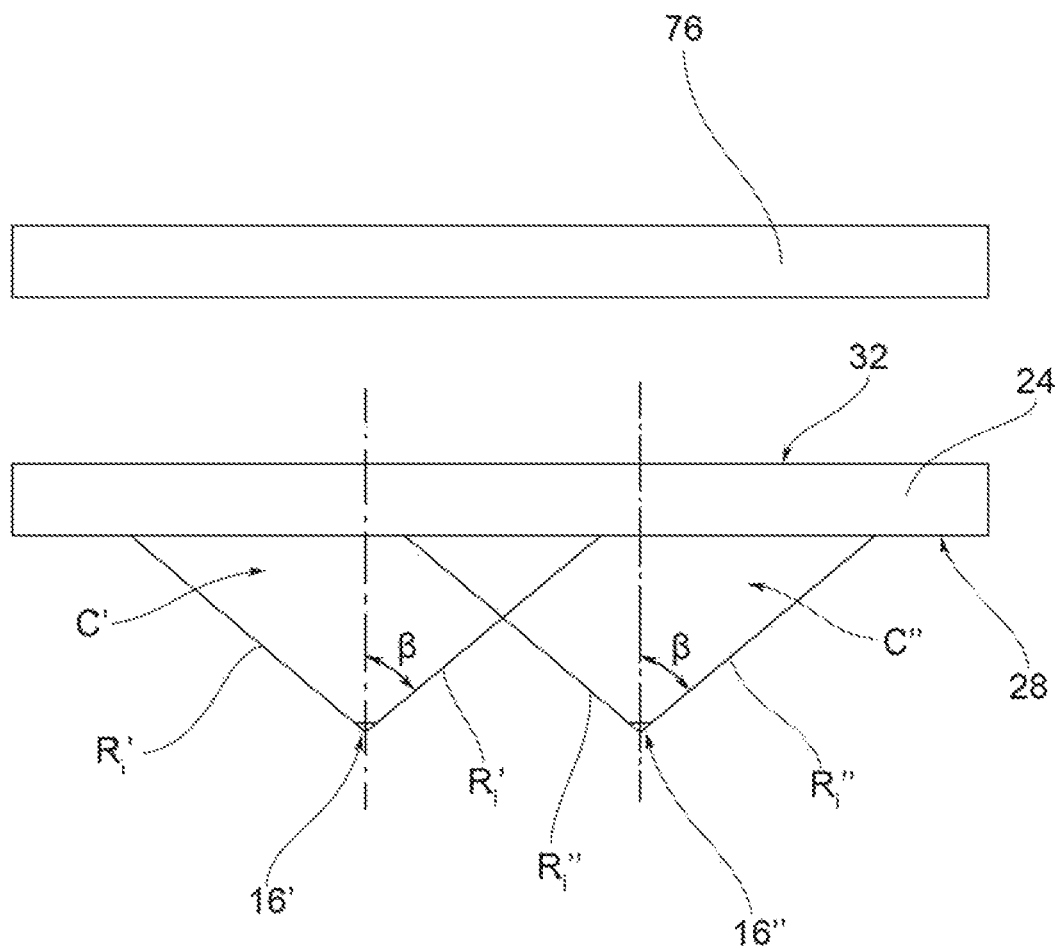
FIG. 13 is another schematic view of the optical behavior of a vehicle light according to the present invention.

The light sources 16', 16" are spaced apart so that two light cones C', C" adjacent each other intersect at least partially on the diffuser body 24 (FIG. 13).

Preferably, the light cones C', C" intersect at the light input wall 28 of the diffuser body 24.

Due to the intersection of the light cones C', C" of light sources adjacent each other, it is possible to get the whole opalescent effect.

According to one embodiment (FIGS. 6 to 10), the diffuser body 24 has a second group 80 of second optical elements 84 defining cylindrical or spherical optics suitable to realize cylindrical or spherical caustics which realize, by subsequent refractions, a scattering of the light rays Ri towards the light output wall 32 in order to produce a beam of light having an opalescent effect.

The second optical elements 84 of the second group 80 are juxtaposed without interruption, for example penetrating each other at least partially, so as to form a single body.

In particular, the second adjacent optical elements 84', 84" at least partially penetrate each other at the second intersection portions 86 which realize a mechanical connection between the second optical elements adjacent to one another.

The second optical elements 84 are placed between the first optical elements 52 and the lenticular body 20 and are separated therefrom by air gaps 56.

In particular, the second optical elements 84 are spaced from the first optical elements 52 by a pitch 88.

The pitch 88 between the first and second group 48, 80 is at least 1.1 times the diameter of the first and second optical elements 52, 84.

Pitch 88 is the distance between the axes of symmetry X-X of the first optical elements 52 and the axes of symmetry Y-Y of the second optical elements 84 directly facing the first optical elements 52 measured parallel to the main direction of propagation L-L.

According to one embodiment, the second optical elements 84 are at least partially staggered along the transverse direction T-T perpendicular to the main direction of propagation L-L of the light beam with respect to the first optical elements 52 so as to stagger the first portions of intersection 54 between two first optical elements adjacent to each other 52', 52" with respect to second intersection portions 86 between two second optical elements 84', 84" adjacent to each other, so as to offset the first and second intersection portions 54, 86 from each other with respect to the main direction of propagation L-L.

According to one embodiment, the second optical elements 84 of the second group 80 have a diameter ranging from 1 mm to 5 mm.

For example, the second optical elements 84 are substantially tangent or penetrate each other for a circular sector 60 equal to 1-10% of their total area, measured with respect to a sectional plane perpendicular to a second axis of symmetry Y-Y of the second optical elements 84.

For the purposes of the operation of the present invention, it is important that there is no free path from the first and/or second optical elements 52, 84 for the light rays Ri. In other words, all the light rays Ri must pass through the first and/or second optical elements 52, 84 to be optically influenced by the same. It should be noted that the tangency or the interpenetration of the second optical elements 84 may depend on the production process: an injection molding process generally assumes an interpenetration of the same elements.

Preferably, the second optical elements 84 are circular cross-section elements, equidistant from each other and having all the same diameter.

Preferably, the second optical elements 84 are the same as the first optical elements 52.

According to one possible embodiment, the second optical elements 84 are cylinders 64 with a circular cross-section, with respective axes of symmetry Y-Y perpendicular to the main direction of propagation L-L of the light beam, equidistant from each other and all having the same diameter.

According to a further possible embodiment, the second optical elements 84 are spheres 68, equidistant from each other and having the same diameter.

For example, the light output wall 32 is arranged on the second optical elements 84, and the diffuser body 24 on the light output wall 32 may have a diffusive portion 72, comprising micro-optics and/or embossing and/or a glaze, suitable to equalize and to diffuse the beam of light coming from the light output wall 32.

It is also possible to provide for a screen 76 arranged between the diffuser body 24, in particular, the second optical elements 84, and the lenticular body 20, wherein the screen comprises a diffusive portion 72, comprising micro-optics and/or embossing and/or a glaze, suitable to equalize and to diffuse the beam of light coming from the light output wall 32. Obviously, the screen is crossed by the light beam incident thereon.

The optical operation of a vehicle light according to the present invention will now be described, so as to clarify how the desired optical effect may be obtained by the use of optical elements such as a diffuser body.

Figure 11:
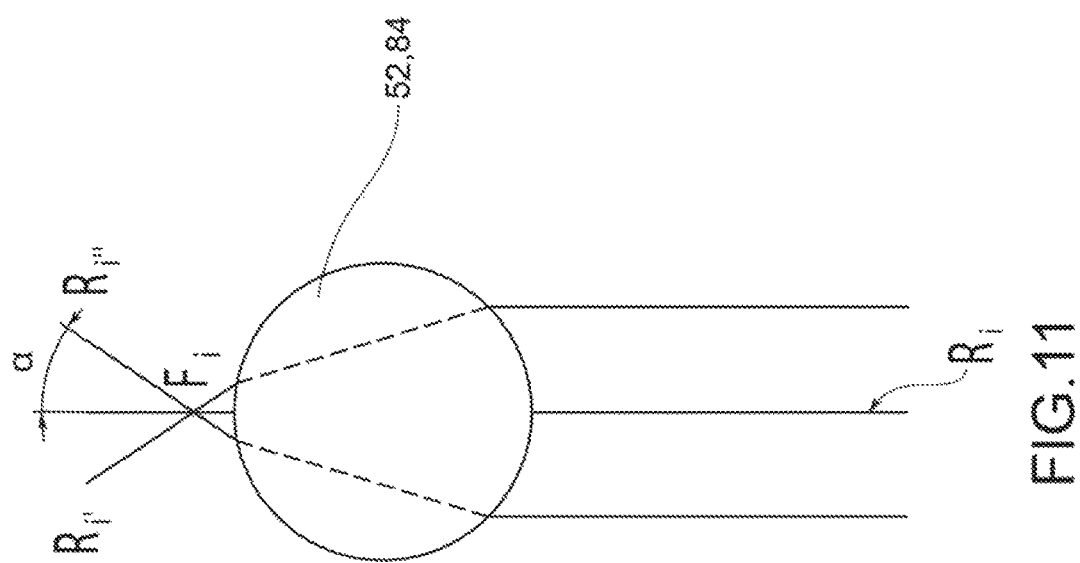
FIG. 11 is a schematic view of the optical behavior of a vehicle light according to the present invention.

In particular, FIG. 11 illustrates the behavior of a light beam having a direction parallel to a light ray Ri that strikes an optical element and, by subsequent refractions and reflections, is deviated according to an angular distribution contained between two extreme output directions R'i, R"i.

Refractions and reflections occur at the passage of the light beam from the air in the gap 56 between the light sources 16 and the first optical elements 52 and the material of the diffuser body 24 of the same optical elements, and subsequently at the passage from the material of the diffuser body 24 to the air of the gap 56 between the first optical elements 52 and the screen 76, or between the first optical elements 52 and the second optical elements 84, if provided. In this latter configuration, the light ray from the gap 56 between the first optical elements 52 and the second optical elements 84 undergoes a new refraction/reflection process when it strikes the second optical elements 84.

The beam is thus diffused in a light cone having an opening angle $2\alpha$ which depends on the materials of the means crossed by the light beam. For example, in the case of the body in PMMA or PC, this angle $\alpha$ is approximately 60 degrees. Such a light cone has an apparent origin inside a virtual focus Fi lying outside the optical element.

FIG. 12 illustrates the same optical diffusion scheme in the case of three distinct light beams each having a direction parallel to a light ray R1, R2, R3 coming from different directions within the diffuser body 24 and striking the same optical element.

Each of the beams is diffused into a light cone having an opening angle $2\alpha$ which is dependent on the materials of the means crossed by the light beam. In particular, each light beam having a direction parallel to a light ray R1, R2, R3 strikes an optical element and, for subsequent refractions and reflections, is deviated according to an angular distribution contained between two extreme output directions R'1, R"1, R'2, R"2, R'3, R"3, respectively.

In addition, each light ray R1, R2, R3 identifies a light cone of $2\alpha$ brightness inside a respective virtual focus F1, F2, F3 lying inside the optical element.

The overlapping of such light cones R'i, R"i coming from different directions makes it possible to obtain, at the output of the optical element, a distribution of light, substantially Lambertian, which is almost identical to the volume scattering typically produced by an opaline material.

As may be appreciated from the foregoing, the present invention overcomes the disadvantages of the prior art.

In particular, the light according to the present invention allows any opalescent-effect light pattern to be obtained without the use of any layer of opaline material on the outer lenticular body of the light or on the diffuser body.

In particular, the geometry of the optical elements develops spherical or cylindrical caustics that exploit the phenomenon of light refraction crossing different means, i.e., the plastic material of the diffuser body and the air. In this way, the incident light beam is splayed with an angle dependent on the materials crossed and is distributed randomly so as to diffuse and scatter the light, obtaining, as seen, the cited opalescent effect.

The interaction of the first and/or second optical elements with such micro-optics or embossing results in a uniform effect, illuminating the diffuser body with LED sources. Which is to say, in the state of activation of the vehicle light.

Obviously, the light of the present invention is capable of fulfilling all the photometric specifications of the light and is able to emit a light beam that is uniform and pleasing to the eye of an observer.

Collectively, the present invention allows a vehicle light to be obtained which produces a light beam that is both uniform and opalescent without any use of opaline material.

One skilled in the art, in the object of satisfying contingent and specific requirements, may make numerous modifications and variations to the vehicle light described above, all of which are within the scope of the invention as defined by the following claims.

The invention claimed is:

1. A vehicle light comprising:
a container body delimiting a containment housing which houses at least one light source, adapted to emit, when electrically powered, a plurality of light rays (Ri) defining a light beam to propagate outside the vehicle light,
a lenticular body, closing at least partially the containment housing and suitable to be crossed at least partially by the beam of light produced by the light source,
a diffuser body defined by a light input wall and a light output wall, said diffuser body facing said at least one light source, so as to be crossed by its beam of light, said diffuser body facing the lenticular body and extending along a main transverse extension (T-T) perpendicular to a main propagation direction (L-L) of the beam of light,
wherein the diffuser body comprises a first group of first optical elements defining cylindrical optics with circular cross-section or spherical optics that produce cylindrical or spherical caustics that produce, by subsequent refractions, a scattering of said light rays (Ri) towards the light output wall in order to produce a beam of light having an opalescent effect,
wherein the first optical elements of the first group are solid bodies juxtaposed without interruption so as to form a single body, and
wherein the first optical elements are separated from the light source and from the lenticular body, by air gaps.

2. The vehicle light as set forth in claim 1, wherein the first optical elements of the first group have a diameter of between 1 mm and 5 mm.

3. The vehicle light as set forth in claim 1, wherein said first optical elements are substantially tangent or penetrate each other for a circular sector equal to 1-10% of their total area, measured with respect to a sectional plane perpendicular to a first axis of symmetry (X-X) of the first optical elements.

4. The vehicle light as set forth in claim 1, wherein said first optical elements are cylinders with a circular cross-section, with respective axes of symmetry (X-X) perpendicular to the main direction of propagation (L-L) of the light beam, equidistant from each other and all having the same diameter.

5. The vehicle light as set forth in claim 1, to wherein said first optical elements are spheres, equidistant from each other and all having the same diameter.

6. The vehicle light as set forth in claim 1, wherein the diffuser body, on the light output wall has a diffusive portion, comprising micro optics and/or embossing and/or a glaze, suitable to equalize and to diffuse the beam of light coming from the light output wall.

7. The vehicle light as set forth in claim 1, wherein the light comprises a screen, placed between the diffuser body and the lenticular body, said screen comprising a diffusive portion, comprising micro-optics and/or embossing and/or a glaze, suitable to equalize and to diffuse the beam of light coming from the light output wall.

8. The vehicle light as set forth in claim 1, wherein the container body houses at least two light sources suitable to emit, when electrically powered, a plurality of light rays (Ri', Ri") which expand in light cones (C', C"), wherein the light sources are spaced apart so that two light cones (C', C") adjacent each other intersect at least partially on the diffuser body.

9. The vehicle light as set forth in claim 1, wherein said light cones (C', C") intersect at the light input wall of the diffuser body.

10. The vehicle light as set forth in claim 1, wherein the diffuser body has a second group of second optical elements defining cylindrical optics with circular cross-section or spherical optics suitable to realize cylindrical or spherical caustics which realize, by subsequent refractions, a scattering of said light rays (Ri) towards the light output wall in order to produce a beam of light having an opalescent effect,
wherein the second optical elements of the second group are solid bodies juxtaposed without interruption so as to form a single body,
wherein the second optical elements are placed between the first optical elements and the lenticular body and are separated from them by air gaps, and
wherein the second optical elements are spaced from the first optical elements by a pitch.

11. The vehicle light as set forth in claim 10, wherein said second optical elements are staggered, along a transverse direction (T-T) perpendicular to the main direction of propagation (L-L) of the light beam, with respect to the first optical elements, so as to stagger first portions of intersection between two first optical elements adjacent to each other with second intersection portions between two second optical elements adjacent to each other, so as to offset from each other said first and second intersection portions with respect to the main direction of propagation (L-L).

12. The vehicle light as set forth in claim 10, wherein said second optical elements of the second group have a diameter of between 1 mm and 5 mm.

13. The vehicle light as set forth in claim 10, wherein said second optical elements are substantially tangent or penetrate each other for a circular sector equal to 1-10% of their total area, measured with respect to a sectional plane perpendicular to a second axis of symmetry (Y-Y) of the second optical elements.

14. The vehicle light as set forth in claim 10, wherein said second optical elements are elements with a circular cross-section, equidistant from each other and all having the same diameter.

15. The vehicle light as set forth in claim 10, wherein said second optical elements are the same as said first optical elements.

16. The vehicle light as set forth in claim 10, wherein said second optical elements are cylinders with a circular cross-section, with respective axes of symmetry (Y-Y) perpendicular to the main direction of propagation (L-L) of the light beam, equidistant from each other and all having the same diameter.

17. The vehicle light as set forth in claim 10, wherein said second optical elements are spheres, equidistant from each other and all having the same diameter.

18. The vehicle light as set forth in claim 10, wherein the light output wall is placed on said second optical elements and wherein the diffuser body, on the light output wall has a diffusive portion, comprising micro-optics and/or embossing and/or a glaze, suitable to equalize and to diffuse the beam of light coming from the light output wall.

19. The vehicle light as set forth in claim 10, wherein the light comprises a screen, placed between the diffuser body and the lenticular body, said screen comprising a diffusive portion, comprising micro optics and/or embossing and/or a glaze, suitable to equalize and to diffuse the beam of light coming from the light output wall.

20. The vehicle light as set forth in claim 10, where said pitch between the first group and the second group is at least 1.1 times the diameter of said first and second optical elements.

* * * * *